Sept. 6, 1938. J. B. EISEN 2,129,349
METHOD OF MAKING CENTER SPOT CROWNS
Filed July 14, 1936
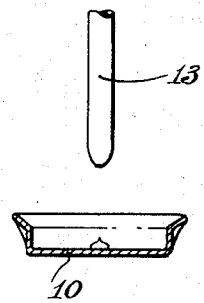
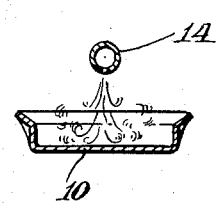
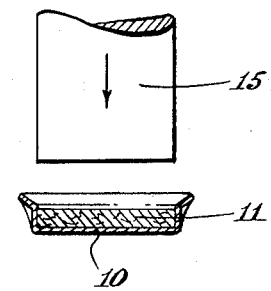
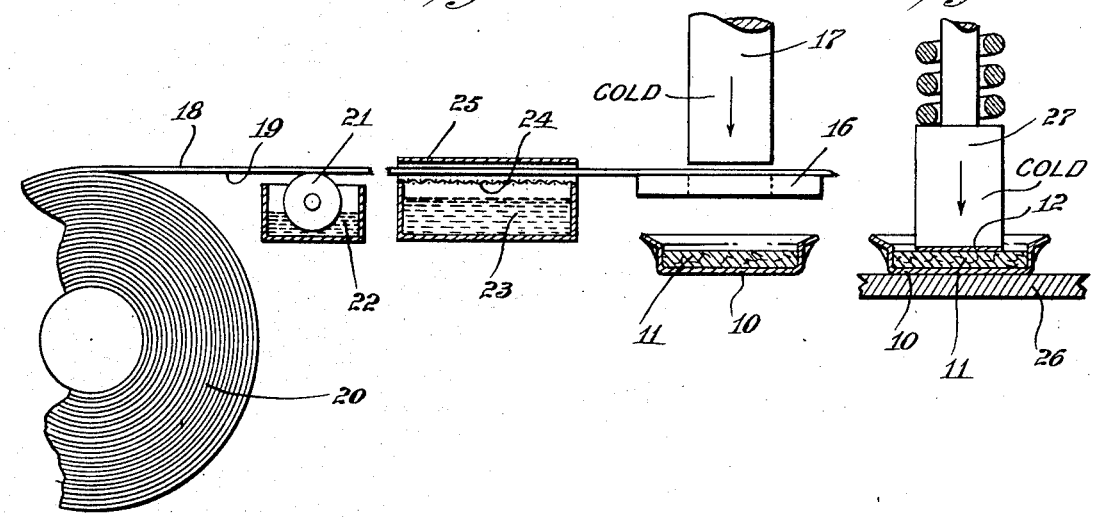
Jay Bernard Eisen
INVENTOR
Frank P. Wentworth
BY
his ATTORNEY Patented Sept. 6, 1938

2,129,349

UNITED STATES PATENT OFFICE 2,129,349

METHOD OF MAKING CENTER SPOT CROWNS

Jay Bernard Eisen, Yonkers, N. Y., assignor to Ferdinand Gutmann & Co., Brooklyn, N. Y., a corporation of New York Application July 14, 1936, Serial No. 90,465

14 Claims. (Cl. 113—80)

The invention relates to a method of making center spot crowns, and more particularly to a procedure by which the center spot discs may be firmly adhered to the cushion disc of a crown without applying heat to the adhesive during the bonding of the center spot disc to the cushion disc.

Prior to the present invention, the practice for many years in the production of center spot crowns has been to cut the center spot discs from a strip of facing material having associated therewith or applied thereto, a heat fusible adhesive in a dry state, and applying heat to the center spot material and therethrough to the adhesive simultaneously with the depositing of the center spot disc upon the cushion disc of a crown. This practice was followed because it was necessary to secure an initial bond between the center spot disc and the cushion disc immediately upon the application of the center spot to said disc, in order to avoid displacement of said spot between the time that it was deposited upon the cushion disc and the time that the completely assembled structure was delivered to the finishing head or pressure drum. In some instances, further heat was applied to the assembly in order to secure a stronger bond between the center spot and the cushion discs. In some instances, a heated cutting die was used, and the heat for fusing the adhesive was transmitted from the heated cutting die through the material of the center spot disc to the adhesive. In other instances, the practice was to heat the cushion disc of the crown prior to the depositing of a cold disc thereon by means of a cold cutting and plunger die.

When the center spots were of a metal foil, such as aluminum or tin, heat was rapidly conducted to the adhesive so as to permit the operation of the spotting machine at the high speeds necessary to make the method commercial. When preheating the cushion discs when a cold plunger die was used in cutting the center spot discs from a strip, it has been found necessary to subject the caps, with the center spot thereon, to an elevated temperature between the application of the center spot discs to the cushion disc and the delivery of the completely assembled crown to the finishing drum.

With the use of adhesives having a low melting point, such as gutta-percha and some resinous adhesives, no difficulty was experienced in properly conditioning the adhesive by the transmission of heat thereto through the center spot material, whether the material of this spot were a metal foil or a finished paper. With adhesives having a higher melting point, or one approaching 170° to 180° F., great difficulty was experienced in conditioning these adhesives when a finished paper spot was to be applied to the cushion disc. This is due to the difficulty of transmitting heat through paper to the adhesive with sufficent rapidity to permit the operation of the spotting machine at normal speeds.

I have found by experiment, that the use of heat for conditioning the adhesive between the center spot disc and the cushion disc is unnecessary, and have devised the herein described method by means of which the heating of any part of the spotting machine is unnecessary, and yet avoid side slipping of a center spot disc upon its initial application to a cushion disc to an extent to limit the number of imperfect caps due to a displacement of the center spot disc or its positioning off center to an extent to interfere with the proper sealing of a bottle.

By applying center spot discs to the cushion discs of crowns without the use of heat, the adhesive takes a final set more rapidly than when heat fusible adhesives are used, and the bond between the center spot disc and the cushion disc is stronger and firmer when the crowns leave the final pressure stage than when a setting of the adhesive is dependent upon its cooling after leaving the pressure stage.

A cold method also has the advantage that it reduces likelihood of mutilation of the decoration upon the metal shell which, in machine handling, is apt to be scraped when the crown is at a fairly high temperature during its passage through the spotting machine.

In the practice of the method of the invention, I use a strip of facing material having upon one side thereof a thin coating of a dry adhesive. Immediately prior to the cutting of each disc from this strip, I apply to the adhesive coating a penetrating volatile solvent in sufficient volume to make the adhesive sufficiently tacky to ensure a light bonding of the center spot disc to the cushion disc by the pressure applied thereto by the plunger die. This bond is sufficiently strong to permit the withdrawal of the plunger die after deposit of the center spot disc upon the cushion disc without likelihood of displacement of the disc. The adhesive, when the center spot disc is applied to the cushion disc, is sufficiently tacky to avoid any side slipping of a center spot disc as it is pressed upon the cushion disc by the plunger, although the solvent will not have been absorbed sufficiently to condition the adhesive for the making of the permanent or final bond between the discs. This is due to the fact that the time interval between the application of the solvent to the adhesive and the deposit of the center spot disc upon the cushion disc is not sufficiently great to permit a complete absorption of the solvent by the adhesive.

The essential characteristic of the invention is the complete elimination of all heat or heated parts in applying the center spot disc to the cushion disc, so that the method is equally applicable to the production of center spot crowns whether the facing material be of a metal foil or of a varnished kraft or express paper or other material suitable for use as a center spot in crown caps.

The invention consists primarily in a method of making center spot crowns embodying therein the feeding of a strip of facing material having a coating of an adhesive soluble by an organic solvent, upon the under face thereof in relation to cold cutting dies including a plunger die, applying a liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a pressure plunger maintained at normal factory temperatures, whereby said center spot disc is applied to said cushion disc without subjecting the adhesive to an elevated temperature; and in such other novel steps and practices as are hereinafter set forth and described, and more particularly pointed out in the claims hereto appended.

Referring to the drawing,

Fig. 1 is a view partly in section showing the depositing in a metal shell of an adhesive for securing a cushion disc within said shell;

Fig. 2 is a similar view showing the application of heat to the adhesive to evaporate the vehicle thereof;

Fig. 3 shows the depositing of a cushion disc upon the tacky adhesive in the shell;

Fig. 4 is a view illustrating the manner of applying a solvent to a strip of material having the under surface thereof coated with a soluble adhesive, and the cutting of center spot discs therefrom and their deposit upon the cushion disc; and Fig. 5 shows the final pressure stage during which the final bond between the center spot disc and the cushion disc is made.

Like numerals refer to like parts throughout the several views.

In the practice of the method of my invention, two procedures may be followed.

In the first of these, the cushion disc is applied to the metal shell and the center spot is applied to the cushion disc in a continuing operation in the same machine. By the other procedure, the cushion disc may be assembled in the metal shell in one machine and the center spot may be applied to the cushion disc of the assembled crown in another machine.

By the first method, the steps shown in the several views of the drawing are followed in rapid succession by a continuing operation of one machine. By the second method, Figs. 1, 2 and 3 illustrate the assembly of the crown cap without the center spot in one machine, and Figs. 4 and 5 illustrate the application of the center spot in an otherwise completed crown.

In the drawing, the ordinary metal shell of a crown cap having a fluted skirt is shown at 10, the cushion disc therein at 11 and the center spot at 12.

By the first procedure above referred to, the shell 10 is brought below an ordinary dropper 13 for depositing an adhesive, such as a solution or emulsion of casein, in the shell. As shown in Fig. 2, the adhesive is then subjected to an elevated temperature from a heater shown conventionally at 14, to remove the vehicle of the casein adhesive and make the adhesive tacky. In the next step, a cork disc 11 is deposited upon the tacky adhesive by means of a feeding plunger 15, as in the crown assembling machine. After the cushion disc 11 has been deposited in the metal shell upon the tacky adhesive, it is brought by the functioning of the machine below a die mechanism consisting of a female die 16 and a plunger die 17 of the usual construction. These dies are cold in the sense that they are at the ordinary factory temperatures.

The crowns in rapid succession are brought below the die 16 and each crown has a momentary dwell while in this position. During the dwell of the crown, or while it is stationary below the die 16, a center spot disc is cut from a strip 18 of facing material, the under side of which has a coating 19 of a soluble adhesive which, while the strip is in the roll 20, is dry. There is a wide choice of soluble adhesives with which the strip of facing material may be coated, but preferably I employ a cellulose derivative adhesive containing a synthetic resin, this being readily obtainable as an open market product.

After passing from the roll 20, the strip 18 is intermittently fed toward the die mechanism 16 and 17, during which movement the coated surface 19 engages a roller 21 in a tank containing a volatile solvent 22 for the material of the coating 19. The solvent, which I prefer to use is ethyl acetate or ethyl acetate mixed with toluene. After leaving the roller 21, the coating 19 is subjected to the vapors from a bath 23 of the same solvent which is used in the bath 22. A screen 24 is used to prevent the sagging of the strip inwardly of the tank containing the bath 23, thus avoiding direct contact of the coating at this point with the liquid solvent. A hood 25 is positioned above the bath to confine the solvent in a manner to prevent its escape into the air.

The vapor from the bath 23 not only prevents the evaporation of the solvent applied to the coating 19 by the roller 21 which is not immediately absorbed by said coating, but also serves to diffuse such solvent in a manner to ensure a substantially uniform distribution thereof throughout the entire area of the coating 19 upon the strip 18. The baths 22 and 23 are closely adjacent the die mechanism, so that when the strip reaches the die mechanism, the adhesive thereon is tacky but not sufficiently soft to cause fouling of the dies.

The intermittent advancement of the strip material and its travel toward the dies 16 and 17 after the application of the solvent to the coating 19, affords a time interval during which the solvent may act to make the coating 19 sufficiently tacky so that when it is pressed by the plunger die 17 against the cushion disc 11, it will adhere thereto with sufficient strength to ensure its remaining in the position centrally of the cushion disc without the application of pressure until the crown reaches the pressure drum, where it is subjected to a continuing pressure for a time sufficient to secure the desired strong bond between the center spot 12 and the cushion disc 11.

A disc is cut from the strip 18 by the descent of the plunger 17 through the die member 16, and said plunger carries the strip into contact with, and deposits it upon, the cushion disc 11 of the crown, developing a slight momentary pressure which, with the slightly tacky adhesive, will cause a temporary bonding of the center spot to the cushion disc without possibility of side slipping of the disc to an extent to position it off center.

Following upward movement of the plunger die 17, the center spot disc 12 will be adhered to the cushion disc 11 with sufficient tenacity to avoid displacement of this disc while it is being conveyed from adjacent the die mechanism to the point where it is delivered to the collecting drum, shown conventionally at 26.

After delivery of the crown to this drum, a continuing pressure is applied throughout the entire area of the center spot by a spring pressed plunger 27, which pressure is maintained until the crown is discharged from the drum. This ordinarily is an interval of from eight to ten seconds.

The spring pressed presser plunger 27 is maintained at normal factory temperatures, the method being such as to not require the application of heat to the assembly for the purpose of securing an adequate bond between the cushion disc 11 and the metal shell 10, and between the center spot disc 12 and the cushion disc 11. The time interval during which the assembled cap is subjected to pressure from said plunger 27 is such as to permit the setting of the adhesive by the evaporation of the volatile solvent applied to the adhesive coating 19 upon the strip 18 of facing material.

When it is desired to follow the second procedure herein referred to, the first three steps shown in Figs. 1 and 3 are practiced in one machine, and the completely assembled cap, except for the presence of the center spot disc, is fed to a second machine in which the steps shown in Figs. 4 and 5 are practiced.

In those instances where the machine used permits the first procedure herein referred to, this procedure is preferable, but if it be attempted to practice the method following this procedure in ordinary crown assembling machines, the length of these machines may not be adequate to permit such practice without modifying the machine structure, in which event it is preferable to divide the method into two stages as heretofore referred to.

Since no heat is required in the method of the invention, it is particularly adapted for the production of center spot crowns using a finished paper as the facing material, although it may be advantageously used with metal foils.

By the term "soluble adhesive", as herein used, is meant, an adhesive soluble by an organic solvent, and by the term "volatile solvent" is meant a liquid organic solvent which will vaporize with sufficient rapidity at ordinary temperatures to permit the adhesive to set rapidly as a result of the elimination of the solvent without the application of heat.

It is not my intention to limit the invention to the particular adhesive herein referred to, since there is a wide selection of adhesives which react rapidly to a volatile solvent applied thereto, but I have found that the cellulose derivative adhesive herein referred to gives a highly satisfactory stick or adhesion of the center spot disc to the cushion disc.

In the accompanying drawing, the various mechanisms are shown merely conventionally, and it is obvious that other means of applying the adhesives to the coating 19 of the strip 18 may be employed, if desired.

Having described the invention, what I claim as new and desire to have protected by Letters Patent, is:—

1. A method of making center spot crowns embodying therein the feeding of a strip of facing material having a coating of an adhesive soluble by an organic solvent, upon the under face thereof in relation to cold cutting dies including a plunger die, applying a liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

2. A method of making center spot crowns embodying therein the feeding of a strip of facing material having a coating of an adhesive soluble by an organic solvent, upon the under face thereof in relation to cold cutting dies including a plunger die, applying a volatile liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

3. A method of making center spot crowns embodying therein the feeding of a strip of facing material having a coating of a soluble cellulose derivative adhesive containing a synthetic resin upon the under face thereof in relation to cold cutting dies including a plunger die, applying a liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

4. A method of making center spot crowns embodying therein the feeding of a strip of facing material having a coating of a soluble cellulose derivative adhesive containing a synthetic resin upon the under face thereof in relation to cold cutting dies including a plunger die, applying a volatile liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

5. A method of making center spot crowns embodying therein the feeding of a strip of facing material having a coating of a soluble cellulose derivative adhesive containing a synthetic resin upon the under face thereof in relation to cold cutting dies including a plunger die, applying ethyl acetate to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

6. A method of making center spot crowns embodying therein the feeding of a strip of facing material having a coating of a soluble cellulose derivative adhesive containing a synthetic resin upon the under face thereof in relation to cold cutting dies including a plunger die, applying an admixture of ethyl acetate and toluene to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

7. A method of making center spot crowns embodying therein the feeding of a strip of facing material having a coating of an adhesive soluble by an organic solvent, upon the under face thereof in relation to cold cutting dies including a plunger die, applying a liquid organic solvent to the coating upon said strip and subjecting said coating with the liquid solvent thereon to the vapors of said solvent prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

8. A method of making center spot crowns embodying therein the feeding of a strip of facing material having a coating of a soluble cellulose derivative adhesive containing a synthetic resin upon the under face thereof in relation to cold cutting dies including a plunger die, applying a liquid organic solvent to the coating upon said strip and subjecting said coating with the liquid solvent thereon to the vapors of said solvent prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

9. A method of making center spot crowns embodying therein the feeding of a strip of facing material having a coating of a soluble cellulose derivative adhesive containing a synthetic resin upon the under face thereof in relation to cold cutting dies including a plunger die, applying ethyl acetate to the coating upon said strip and subjecting said coating with the ethyl acetate thereon to the vapors of ethyl acetate prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

10. A method of making center spot crowns embodying therein the feeding of a strip of facing material having a coating of a soluble cellulose derivative adhesive containing a synthetic resin upon the under face thereof in relation to cold cutting dies including a plunger die, applying an admixture of ethyl acetate and toluene to the coating upon said strip and subjecting said coating with the solvent admixture thereon to the vapors of ethyl acetate and toluene prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

11. A method of making center spot crowns embodying therein depositing an adhesive in the shell of a crown cap, subjecting said adhesive to an elevated temperature to make it tacky, depositing a cushion disc within said shell upon said tacky adhesive, bringing the crown by a continuing operation below cold cutting dies including a plunger die, feeding a strip of facing material having a coating of an adhesive soluble by an organic solvent, upon the under face thereof in relation to said dies, applying a liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

12. A method of making center spot crowns embodying therein depositing an adhesive in the shell of a crown cap, subjecting said adhesive to an elevated temperature to make it tacky, depositing a cushion disc within said shell upon said tacky adhesive, bringing the crown by a continuing operation below cold cutting dies including a plunger die, feeding a strip of facing material having a coating of a soluble cellulose derivative adhesive containing a synthetic resin upon the under face thereof in relation to said dies, applying a liquid organic solvent to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuous pressure to said center spot disc by a presser plunger maintained at normal factory temperatures, whereby said center spot disc is applied to said cushion disc without subjecting the adhesive to an elevated temperature.

13. A method of making center spot crowns embodying therein depositing an adhesive in the shell of a crown cap, subjecting said adhesive to an elevated temperature to make it tacky, depositing a cushion disc within said shell upon said tacky adhesive, bringing the crown by a continuing operation below cold cutting dies including a plunger die, feeding a strip of facing material having a coating of a soluble cellulose derivative adhesive containing a synthetic resin upon the under face thereof in relation to said dies, applying ethyl acetate to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

14. A method of making center spot crowns embodying therein depositing an adhesive in the shell of a crown cap, subjecting said adhesive to an elevated temperature to make it tacky, depositing a cushion disc within said shell upon said tacky adhesive, bringing the crown by a continuing operation below cold cutting dies including a plunger die, feeding a strip of facing material having a coating of a soluble cellulose derivative adhesive containing a synthetic resin upon the under face thereof in relation to said dies, applying an admixture of ethyl acetate and toluene to the coating upon said strip prior to the delivery of the strip in relation to said dies, whereby said adhesive is made tacky, cutting a disc from said strip and depositing it upon a cushion disc in a metal shell while at normal factory temperatures, applying pressure to said center spot disc when depositing it upon said cushion disc, and thereafter applying a continuing pressure to said center spot disc by a presser plunger maintained at normal factory temperatures, whereby said center spot disc is applied to said cushion disc without subjecting the adhesive to an elevated temperature.

JAY BERNARD EISEN.